United States Patent [19]

Finley

[11] Patent Number: 4,699,719

[45] Date of Patent: Oct. 13, 1987

[54] PROCESS AND APPARATUS FOR UTILIZING ENGINE EXHAUST HEAT IN OIL FIELD OPERATIONS

[76] Inventor: Harry W. Finley, P.O. box 1580, Casper, Wyo. 82602

[21] Appl. No.: 774,435

[22] Filed: Sep. 10, 1985

[51] Int. Cl.⁴ .................. B01D 17/032; B01D 19/00
[52] U.S. Cl. ............................ 210/742; 210/744; 210/774; 210/104; 210/114; 210/115; 210/149; 210/187; 55/169; 55/170; 55/175
[58] Field of Search .......... 55/45, 166, 169, 170, 55/175; 210/742, 744, 104, 110, 114, 115, 149, 187, 539, 774, 180

[56] References Cited

U.S. PATENT DOCUMENTS

| | | | |
|---|---|---|---|
| 2,284,809 | 10/1939 | Dyer | 123/3 |
| 2,656,925 | 6/1950 | Johnson | 210/801 |
| 2,698,055 | 1/1952 | Williams | 166/75 |
| 2,825,422 | 3/1958 | Schoenfeld | 210/187 |
| 2,995,202 | 8/1961 | Glasgow | 55/175 |
| 3,318,448 | 5/1967 | Fryer | 210/187 |
| 3,892,276 | 11/1973 | Wells | 166/267 |
| 4,198,214 | 4/1980 | Heath | 55/45 |

Primary Examiner—Benoit Castel
Assistant Examiner—Richard Jordan
Attorney, Agent, or Firm—Dorr, Carson, Sloan & Peterson

[57] ABSTRACT

Exhaust heat from engines used in oil field operations can be utilized to (1) at least partially separate a water-containing wellstream fluid into a progressively enlarged hydrocarbon phase which floats on the remainder of the wellstream fluid and/or on a water phase and (2) vaporize lighter fractions of the hydrocarbon phase for use as fuels for such engines. The level of the wellstream fluid in the separation vessel and the depth of the hydrocarbon phase which forms a top of the remainder of the wellstream fluid and/or water phase are automatically adjusted so that a heater tube which directs exhaust heat through the separation vessel is predominately in contact with the hydrocarbon phase. The lighter hydrocarbon vapors thus produced are collected and, preferably, superheated prior to being used as fuels.

7 Claims, 2 Drawing Figures

PROCESS AND APPARATUS FOR UTILIZING ENGINE EXHAUST HEAT IN OIL FIELD OPERATIONS

BACKGROUND OF THE INVENTION

1. Field of the Invention

This invention relates to the utilization of engine exhaust heat to vaporize hydrocarbon components of fluids taken from oil and gas wells in order to use said vaporized hydrocarbons as fuels, particularly for internal combustion engines located in remote petroleum field operations.

2. Description of the Prior Art

The prior art has long recognized that the entrained vapors of and/or the low-boiling constituents of many petroleum wellstream fluids (e.g., paraffinic hydrocarbons up to hexane, and particularly propane) make excellent fuels for heat engines in general and internal combustion engines in particular. It is also well known that as the temperature applied to such wellstream fluids is increased the character of the compounds obtained from such fluids, particularly crude oil, also changes. The paraffins are rapidly displaced in predominance by other types of hydrocarbons which are not directly usable as fuels, particularly for internal combustion engines. The prior art has also long recognized that heat from an engine's exhaust can be used to separate low-boiling petroleum constituents which make good fuels from higher boiling constituents which do not make good fuels, at least for internal combustion engines. Those devices which use exhaust heat for such purposes are chiefly concerned with carrying out two main functions: (1) separating petroleum products from those foreign substances, particularly water, that usually accompany the petroleum products (often in the form of emulsions) in petroleum wellstream fluids and (2) separating lighter hydrocarbons from the heavier ones so that the former can be used as fuels and thereby replace the more expensive gasoline, diesel oil and propane fuels which otherwise must be hauled to the remote locations where petroleum field operations usually take place. Patents disclosing such prior art devices include:

U.S. Pat. No. 2,284,809 which teaches use of exhaust heat to obtain non-cracked diesel oils, kerosene or gasoline from a pure crude oil stream such as those pumped through oil pipeline systems. Separation of oil and water mixtures or emulsions is not taught or suggested in this patent;

U.S. Pat. No. 2,656,925 teaches the use of engine exhaust heat to facilitate the breaking of oil/water emulsions by lowering viscosities and using differential coefficients of expansion of the components of a wellstream fluid. The use of a heater element having a large surface area purposely located at the oil/water interface is emphasized in order to carry out the disclosed emulsion breaking function. The oil/water interface is adjusted to the level of the heater element by a siphon and drainage system;

U.S. Pat. No. 3,892,276 also teaches a method of breaking down water/paraffin emulsions to facilitate separation of water from a wellstream fluid. Exhaust gases flow counter to the flow of oil. Vaporization of the oil for use as a fuel is not disclosed; and U.S. Pat. No. 2,698,055 teaches a process for generating fuel gases from a pure oil stream using engine exhaust heat. Again, the matter of separating impurities such as water from the oil is not addressed.

SUMMARY OF THE INVENTION

1. Context and Scope

This invention is concerned with processes and apparatus for using heat found in exhaust from various kinds of engines in order to separate hydrocarbon components of petroleum wellstream fluids from those foreign materials usually found in such wellstream fluids, particularly water. This invention is also concerned with processes and apparatus capable of carrying out this separation function automatically, especially in remote locations, with minimal human attendance. In order to further place this invention in its proper context, it should also be noted that the terms "petroleum wellstream fluids", "hydrocarbon fluids" and like expressions are intended to include those fluids taken from gas wells as well as those taken from oil wells. Those skilled in the art will appreciate that hydrocarbon gases are often dissolved or otherwise suspended in wellstream fluids, particularly those under high pressures. When such high pressures are removed, or when other thermodynamic conditions are changed, such as when the temperature is raised, such dissolved hydrocarbon gases are often produced. Hence the terms "fluid" or wellstream fluid should be taken in their broadest sense to include liquids, vapors and/or gases. The processes and apparatus disclosed herein do however have greater applicability to oil well operations. They are particularly applicable to those situations where water is a component, and often a major component, of the wellstream fluid. Such water is produced in the form of oil/water mixtures and/or emulsions. Moreover, it is often produced in conjunction with other contaminating substances.

It should also be noted that the term "separation" as used with respect to oil/water mixtures or emulsions in this disclosure can be taken to mean the production of a relatively distinct oil phase which floats on a relatively distinct water phase; or it can be taken to mean the production of an oil phase which floats on a less distinct oil/water emulsion which in turn floats on a relatively distinct water phase. This patent application may sometimes speak of hydrocarbon or oil phases and water phases as if they were the only forms present, but in reality an emulsion layer may well separate any given hydrocarbon phase from a water phase. In a like vein, the term "normal" operating conditions should generally imply those conditions where fuel is being generated from the wellstream fluid, particularly after the hydrocarbon phase has been built up to its maximum width. The word normal also will usually imply that the heater tube is delivering heat energy primarily to an oil phase formed on top of a water phase. Abnormal, start-up or upset conditions are those which would generally be produced by conditions outside the vessel such as, for example, the introduction of a slug of "pure" water or "pure" oil into a wellstream fluid which is usually a mixture of these two components. Since field conditions usually vary in many respects over time, it is a primary objective of this invention to provide apparatus and processes which can automatically react to and adjust to the kinds of variations usually encountered in the context of petroleum field operations—especially those carried out in remote locations.

Also with respect to the general context of this invention it should be noted that various kinds of heat engines, particularly those used to pump and transfer fluids in oil field operations can be fueled by the light hydrocarbons produced by this invention. Fuels for internal combustion engines (e.g., those fueled by diesel fuel, gasoline or propane vapors) are of course of primary importance since they are so widely used. However, the process and apparatus of this invention could also be used with other kinds of heat engines such as steam engines. Such engines were once widely used in oil field operations and they are, once again being considered because, among other things, heavier, less refined, and hence less expensive forms of fuels can be used to fire their boilers. Similarly the processes of this invention could be driven by heat taken from any convenient local source, but in most instances the best local source is the exhaust heat from engines used in petroleum field operations.

2. Essential Concepts

The processes and apparatus of this invention can be refined and enhanced by the addition of many features which represent preferred embodiments of this invention, but which are not absolutely necessary for its successful operation. These additions are also not necessary to distinguish this invention from those prior art devices which also use exhaust heat to separate lighter hydrocarbon components of wellstream fluids for use as fuels. The essential features of this invention are:

1. Separation of petroleum wellstream fluid in a reaction vessel into (1) a hydrocarbon phase which is progressively enlarged in the vessel to some maximum fraction and (2) a nonhydrocarbon phase which is progressively decreased in the vessel to some minimum fraction.

2. Transfer of heat energy, particularly heat energy obtained from engine exhaust, to the hydrocarbon phase rather than the water phase.

3. Control of the input of the wellstream fluid into the vessel based upon a verification that the conditions already existing in the vessel are capable of vaporizing at least a portion of the lighter hydrocarbons in the vessel.

In a broader sense of this invention, the verification of the conditions within the vessel relate to a matching of the heat made available to the vessel and the heat duty required to produce fuel vapors from hydrocarbons in the wellstream fluid. The verification could be based upon a sensing of many parameters e.g., temperature, pressure, liquid levels, exhaust heat, mass flow and/or a sensing of combinations of such parameters. Those skilled in the art will appreciate that any such sensing ultimately is related to the dynamic relationships between such parameters. However, for reasons of simplicity and reliability, Applicant prefers to verify conditions in the vessel by sensing the temperature at one or more locations in the vessel. Preferably the temperature is taken at a horizon within the vessel where the hydrocarbon phase is intended to be located during "normal" operation of the device. That is when the hydrocarbon phase has been enlarged to its highest fraction, given the hydrocarbon content of the wellstream fluid.

In its preferred mode of operation the processes and apparatus of this invention strive toward operating conditions whereby "new" wellstream fluid is introduced into the vessel only when it has been verified that the then existing thermodynamic conditions in the vessel are capable of vaporizing fuel vapors from wellstream fluid. Most preferably the act of introducing new wellstream fluid into the vessel is completely independent of any operating parameters other than temperature, then existing in the vessel. For example, such introduction is independent of the liquid level already in said vessel. However, after reading this entire disclosure, those skilled in the art will also appreciate than another parameter, namely pressure, is having an effect on the process even though it is not being directly sensed or directly acted upon. This process takes into consideration how pressure will react and "naturally" takes advantage of these reactions in the form of open control loops, i.e., those without feedback systems. For example, later in this disclosure it will be shown how, when the engine is not using fuel as fast as it is being produced, the pressure within the reaction vessel will increase. It will eventually rise above the pressure on the wellstream feed line. At this point, even though the control valve operated by sensing temperature is open, no new wellstream fluids will be introduced into the vessel when the pressure in the vessel becomes greater than the motive pressure of the incoming wellstream fluid. Utilization of the vessel's internal pressure to "naturally" control (particularly control by throttling, rather than by an on/off control) the feed of wellstream fluids is a highly preferred method of controlling the processes of this invention since no items of apparatus are needed and since other methods of control, e.g., venting excess fuel based on the pressure within the vessel, would require pressure sensing equipment within the vessel which, as is normally the case, are both expensive and subject to troublesome and/or dangerous failures.

Thus, in effect, operation of the temperature control valve on the basis of temperature verification, preferably taking place inside the vessel, directly controls the most preferred embodiments of this invention. Such temperature based control tends to maximize the amount of usable (light hydrocarbon) fuel produced from a given wellstream fluid. It does this by introducing new feed into the vessel in as great an amount and as quickly as the available heat from the heat source (e.g., engine exhaust) can bring the new feed to the desired operating conditions. Preferably the temperature control means will act to throttle the incoming wellstream rather than operate on the basis of an on/off control system.

Consequently, given the existence of the required temperature in the vessel, new wellstream fluid will enter the vessel until an upper liquid level is sensed by a level controller. Preferably this will cause a liquid outlet valve to open. If the outlet valve is near the bottom of the vessel, the lowest horizons in the vessel will drain first. Since the water phase is "naturally" located at the bottom of a body of fluid having a water phase and a hydrocarbon phase, the water fraction of the wellstream fluid will drain first. The level of wellstream fluid will descend until a lower liquid level is sensed, preferaby by the same liquid level controller that sensed the upper liquid level. When this lower level is reached the vessel will stop draining. Hence, the process of repeatedly introducing an oil and water mixture and repeatedly first draining the water phase created by the separation process within the vessel builds up or enlarges the hydrocarbon phase. Eventually, the heater tube used to drive the separation process will become totally immersed in the built up hydrocarbon phase. That is to say, in such normal operations, the heater tube will eventually have no contact with the water phase on the bottom of the vessel.

In a preferred mode of operation of this invention, when the liquid outlet is closed, a fuel vapor outlet valve is opened so that any fuel vapors produced are transferred to another separate portion of the vessel or to an entirely different vessel. Conversely, when the upper liquid level is reached the vapor outlet valve is closed. Most preferably the liquid outlet valve and vapor outlet are both operated by the same liquid level controller.

Obviously, if the wellstream fluid became a pure slug of water no fuel vapors could be produced from it. Consequently, an auxiliary fuel supply system will normally be needed until the wellstream fluid being introduced into the vessel again contains a hydrocarbon component. In many cases, this process will not be able to provide all the fuel requirements of the engine. Nonetheless, it can be used to offset the need for outside fuel. In other cases the process may produce excess fuel which can be stored and/or used to fuel other engines.

The above concepts constitute the essential features of this invention. Additional features, e.g., more complex wellstream fluid input and dumping valve systems, such as those discussed in conjunction with FIG. 2 can be added to enhance the essential process features and apparatus elements of this invention. For example, this disclosure vessel is shown as a single unit with a preheating compartment in fluid connection with the main compartment and a vapor collection compartment separated from the main compartment but still within the unit. Those skilled in the art will readily appreciate that a series of separate vessels could be used to carry out the same process functions.

DETAILED DESCRIPTION OF A PREFERRED EMBODIMENT OF THIS INVENTION

Figure 1:
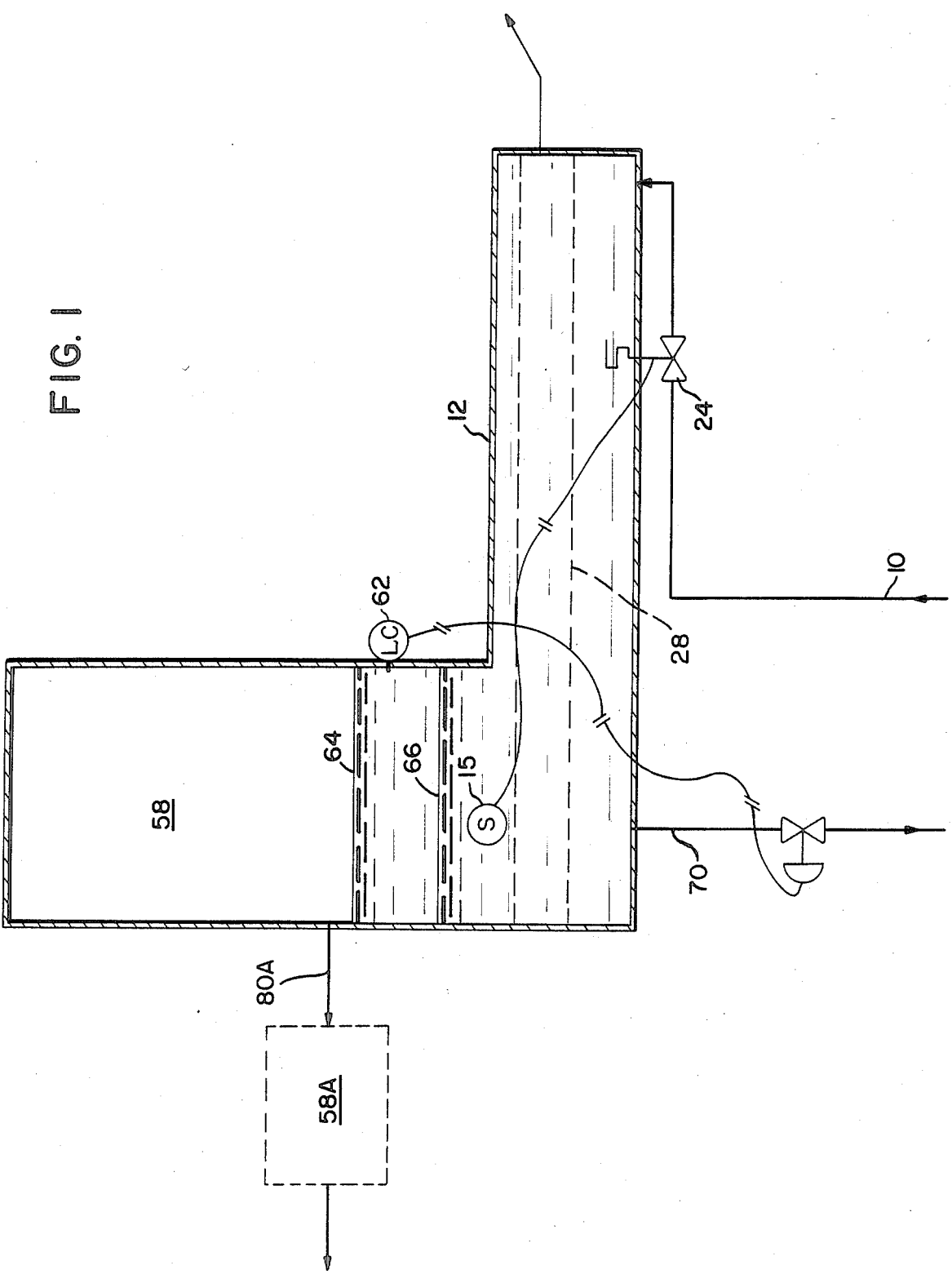
FIG. 1 is a flow diagram emphasizing the essential elements of this invention.
Figure 2:
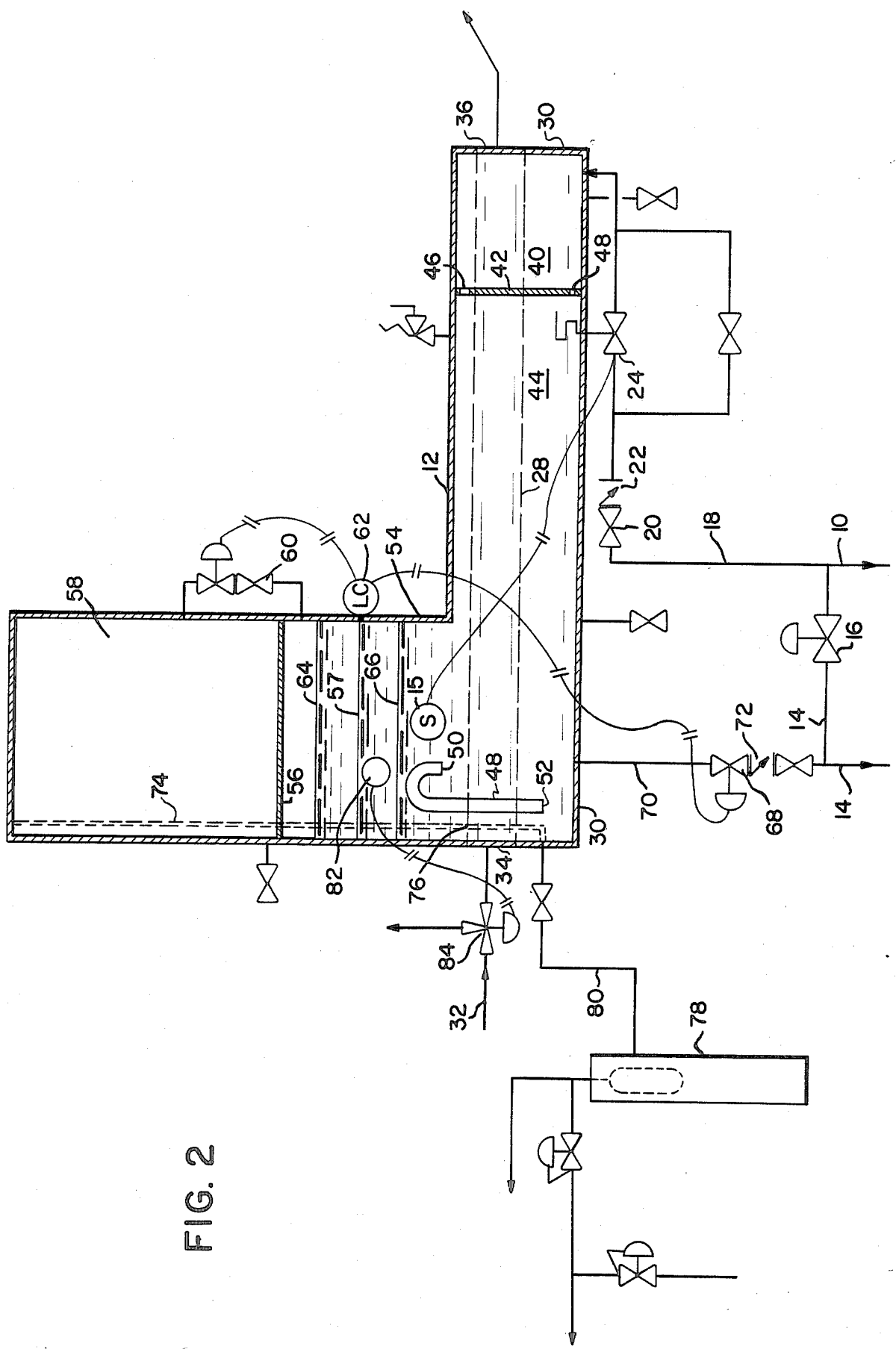
FIG. 2 is a flow diagram showing a number of preferred features of this invention used in conjunction with the essential elements shown in FIG. 1.

FIG. 1 illustrates a simplified but less preferred embodiment of this invention. It shows the most essential apparatus elements in an arrangement capable of producing the essential process steps of the invention. FIG. 2 on the other hand traces the flow of fluids through a number of additional apparatus elements which serve to produce a series of more preferred embodiments of this invention. For the sake of continuity of thought, like elements in FIGS. 1 and 2 will be given the same reference numbers. Referring now of FIG. 1, a wellstream fluid 10 is introduced into reaction vessel 12 via input control means 24. The act of introducing wellstream fluid 10 into vessel 12 depends on a verification of existing conditions within the vessel. As previously discussed, temperature pressure, liquid level, exhaust heat quality as well as combinations of these parameters could be detected by parameter sensor means 15 located in the vessel. Again however, the most preferred parameter to sense is temperature. Most preferably the temperature of the hydrocarbon phase (not shown within the vessel) formed by the action of the heater tube 28 is the parameter to be sensed. Input means 24 is therefore a temperature controlled valve which most preferably operates independent of any other parameters (e.g. liquid level) in the vessel. A temperature controlled valve which throttles, rather than turns the flow on and off is highly preferred. The vessel 12 is also provided with level control means 62 capable of sensing an upper level 64 and a lower level 66. Vapor outlet means 80A allows exit of fuel vapors from a top portion 58 of the vessel 12 or from a totally separate vapor collection vessel 58A. Most preferably, the wellstream fluid will enter the vessel, if the temperature conditions of parameter sensor 15 are met, and if the existing pressure within the vessel is less than the motive pressure on the wellstream 10, until the liquid level reaches level 64. Wellstream fluid will exit the vessel until level controller 62 closes line 70 by valve means hereinafter more fully described with respect to FIG. 2. Most preferably line 70 is located near the bottom of the vessel so that a hydrocarbon phase is progressively built up as the vessel repeatedly takes in a wellstream fluid having hydrocarbon and water and repeatedly dumps a fluid which is predominately water.

FIG. 2 depicts the flow of wellstream fluids, engine exhaust heat and fuel in a preferred embodiment of this invention. As noted in the above discussion of FIG. 1, this process can be thought of as beginning when an incoming stream of wellstream fluid 10 from a petroleum well (not shown) is introduced into a separation vessel generally indicated by number 12. Preferably the incoming stream of fluids 10 undergoes one or more heat exchange with any available local heat sources, such as the hot fluid stream 70 which exits the vessel 12, before the incoming wellstream fluid 10 enters said vessel 12. Most preferably, the incoming stream 10 also should be provided with a bypass path 14, which further comprises valve means 16, whereby the incoming stream of fluids 10 can be made to completely bypass the vessel 12 and be directed to gravity separation tanks, heater treater facilities and/or storage tanks (not shown) if said wellstream fluid is not taken into the vessel 12. That is to say the bypass function is determined by whether the unit has the capacity to accept more wellstream (as determined by the temperature sensed within the vessel, and/or whether the engine needs more fuel as determined by the pressure within the vessel. Valve means 16 also serves a safety function since a closing of the inlet control valve 24 without providing a bypass loop for the pump driven wellstream fluid could create ruptures in the system. Valve means 16 could be hand operated, but an automatic backpressure valve, capable of providing a constant differential pressure, is highly preferred since it is capable of the kind of fully automatic operations toward which this invention strives. The differential pressure in such a backpressure valve should be adjusted to a relatively low setting since the pressure differential it creates marginally increases the horsepower requirements of the pump engine (not shown) which drives the incoming wellstream fluid 10. Applicant has found that a differential pressure of from about 2 to 15 PSI and preferably about 5 PSI will suffice in most operating circumstances in which this invention is utilized. Those skilled in the art will appreciate that there will be a natural pressure fluctuation in the flowlines caused by the intermittent flow characteristics of reciprocating pumps. The magnitude of these fluctuations is a function of the size and condition (extent of blockage by paraffin or foreign matter) of the flowlines, length, number of turns, amount of fluid moved in a stroke, speed of the pump cycle etc. However, the differential pressures on valve means 16 may vary considerably from one petroleum well to another. However, with respect to the processes disclosed herein, higher pressure differentials than may be needed are preferred to lower ones because if the differential is lower than the fluctuation, both feed and dumping of the processes of this invention become functions of the point in the pump cycle at which the valves open. The resulting swings and constant loss of equilibrium disturbs the system needlessly. Again, however, a 2–15 PSI differential will cover most situations.

Preferably that portion of the incoming wellstream 10 which is not bypassed through valve means 16, passes over line 18, through block valve 20 and check valve 22 before it passes through control valve 24 prior to entering the separation vessel 12. Block valve 20 can be manually operated since it is used primarily in operator attended maintenance and/or start-up operations. Check valve 22 is preferably a spring loaded check valve rather than a swing check valve since the latter type do not always react quickly enough to reverse flows which can be produced in this process by the downstroke of the wellstream pump and/or by the pressures created in the separation vessel 12 as lighter hydrocarbons are vaporized therein by the action of a heater tube 28 which extends through the reaction vessel 12.

A stream of engine exhaust heat 32 is introduced into the heater tube 28 at the exhaust intake side 34 of a lower section 30 of the separation vessel 12; said heat is then transferred to the wellstream fluid 10 in the separation vessel 12 and exits the vessel 12 at exhaust port 36 which vents to the atmosphere.

For the reasons previously discussed, control valve 24 plays a vital role in the overall process of this invention. Preferably it controls both the act of feeding wellstream fluid 10 into the vessel 12 and the rate at which the wellstream fluid 10 is fed into the vessel. The act of feeding wellstream fluid into the vessel 12 can be controlled in a number of ways. However this invention is greatly concerned with achieving control of the wellstream input into the vessel on the basis of first verifying that the conditions already existing in the vessel are capable of vaporizing at least a portion of any lighter hydrocarbons already in the vessel. Again, those skilled in the art will appreciate that this verification can be based upon a number of different operating parameters existing in the vessel, e.g., temperature of liquid within the vessel, temperature of the vapor, temperature of the exhaust heat, pressure of the vapor, liquid levels etc., as well as combinations of such parameters, particularly those combinations analyzed by computer systems. Those skilled in the art will also appreciate that the dynamic relationships of virtually all these parameters could also enter into any such verification. However, for reasons of simplicity, reliability and economy, Applicant prefers to make this verification on the basis of only one operating variable—temperature. Most preferably the temperature verified is that of the liquid hydrocarbon phase. A less preferred, but still operable verification could, for example, be based upon verification of the temperature of the exhaust stream as it leaves the main section 44 but before it enters preheat section 40.

Those skilled in the art also will appreciate that, regardless of the operating parameters which are used, the ultimate purpose of the verification is the match the actual heat duty required to the heat duty available. That is to say, it would not make technical or economic sense in the operation of this process to introduce more, cooler, wellstream fluids into the vessel 12 if (1) the thermodynamic conditions (temperature, pressure) conditions within the vessel were not capable of driving off those light hydrocarbons from the wellstream fluid already within the vessel or if (2) the wellstream fluid which were already within the vessel were still capable of giving up substantially more lighter hydrocarbons. In other words, the apparatus and process of this invention are intended to produce operating conditions whereby "new oil" is introduced into the vessel only when the exhaust heat available has already brought the contents of the vessel to some prescribed and verified level. Preferably the new oil is introduced only after the oil existing in the vessel has given up a major portion of its lighter hydrocarbon content. Once more, Applicant prefers to direct the verification at one parameter, namely temperature.

To this end, valve 24 is controlled solely by temperatures existing at one or more select locations within the lower section 30 of the vessel 12, rather than being controlled by other operating variables, e.g., pressure, liquid levels etc., existing in any other location within the separation vessel 12. That is to say, temperature control valve 24 is set to open only when the temperature in the lower section 30 of separation vessel 12 is above a given set point of temperature control valve 24. Typically such a temperature might be in the range of about 120° F. to about 250° F. when the temperature being measured is that of the hydrocarbon phase at a point somewhat removed from the heater tube 28. Self-operated temperature control valves which open on rising temperatures are particularly suited for this purpose. However, those skilled in the art also will appreciate that this control function could also be accomplished by a control valve used in conjunction with a temperature controlled valve. Most preferably the tempeaure controlled valve throttles the wellstream inflow rather than turning it on and off. Suffice it to say that the rate of flow of the incoming wellstream 10 could also be at least partially controlled by throttling manual block valve 20. However, and again for reasons of automatic operations, the use of automatic throttling controls on temperature control valve 24, rather than the use of other manual controls such as block valve 20, are a preferred mode of operation; again, since one of the chief objects of this process is self actualization and control in order to minimize those expenses associated with attended, manual operations.

The temperature sensor 15 which is sensed by temperature control valve 24 can be located at any level in the vessel. However, the temperature setting of the sensor 15 must be adjusted in accordance with the desired temperature profile of the vessel. None the less, the sensor 15 is most preferably located in the lower section 30 of the vessel 12, somewhat removed from the heater tube 28 itself and most preferably in the region where the liquid oil phase will be located during "normal" operation of the vessel. The temperature at the sensor 15 is a function of many variables, including: the temperature of the engine exhaust, speed of the engine (which determines the mass flow of the exhaust), distance from the exhaust tube 28, the hydrocarbon/water composition of the wellstream, flowing temperature of the incoming wellstream fluid 10, heat losses to the ambient air, etc. Generation of hydrocarbon vapors does not however, per se effect the temperature at the sensor 15 since temperature and pressure determine the vapor pressure of such vapors. Regardless of the number and nature of these variables, applicant has found that for the purposes of carrying out the process of this invention, the temperature at the sensor 15 provides the best single, most reliable, simple and relatively inexpensive parameter for automatically controlling, especially under varying operating conditions, the inflow of wellstream fluid 10. If effect this verification of temperature is a verification that the heat energy introduced into the vessel by the exhaust heat matches the heat duty required to produce fuel vapors from the liquid hydrocarbon phase.

FIG. 2 also illustrates another preferred embodiment of this invention wherein the incoming wellstream fluid 10 undergoes another optional preheating process before undergoing the main separation process. This optional preheat process can take place inside or outside of the vessel 12; for example, it can use exhaust heat stream 32 and/or some other available source of heat such as the previously noted vessel dump stream 70. In any case, Applicants have found that, when used, the preheat process is most conveniently carried out in a preheat section 40 formed near the exhaust side 36 of the vessel by use of a partition 42 which separates the lower section 30 of the vessel 12 into a preheat section 40 and a main section 44. Partition 42 is provided with at least two openings hereinafter more fully described. Obviously, the quality of the stream of exhaust heat 32 is lowered as it travels through the heater tube 28. Nevertheless, the heat which reaches the preheat section 40 is still capable of beginning to at least partially separate and/or break down any oil/water emulsions in the wellstream fluid 10. That is to say, wellstream fluid 10, at any temperature less than that found in the preheat section 40, will accept any available heat from the exhaust heat stream 32 and thereby (1) preheat the wellstream fluid 10 before it enters the main section 44 of the separation vessel 12 and thereby reduce the thermal shock associated with its entry (2) decrease the heat required in the main section and consequently increase the capacity of the system and (3) begin the process of stratifying the wellsteam fluid 10 into a hydrocarbon phase which floats on top of a water phase.

Hydrocarbon vapors can be generated in the preheater section 40, particularly when the incoming well stream 10 contains hydrocarbon gases in the solution. The amount of such gases generated will vary with the effective temperature of the preheater section 40 which, in contrast to the controlled temperatures of the main section 44, can be allowed to "float" to any temperature generated by the exhaust heat at this point in the heater tube 28. The tendency of partition 42, which is preferably made of a metal such as steel, to transmit heat can be somewhat diminished by making that portion of the heater tube 28 which passes through the main section 44 larger than necessary to effect efficient heat transfers. In effect this causes that portion of the heater tube 28 in the main section 42 nearest to the partition 46 to be less effective in transferring heat to the wellstream fluid in the main section 42 of vessel 12. The resulting relatively "dead" section of fluid acts as an insulator between the main section 44 of the vessel 12, where temperature control is important, and the preheater section 40 where temperature is relatively unimportant.

Any solution gas and/or vapors generated in the preheater section 40 is allowed to enter the main section 42 through a slot 46 cut in the upper regions of the partition 42 and thereby adding to the vapors generated in the main section 30. Another much smaller slot 48 is located in the lower region of the partition 42. This smaller slot 48 allows any water separated in the preheat section to exit the preheater section 40 and flow along the bottom of the main section 44 of vessel 12. That is to say, partition 42 acts as a two phase weir. The larger slot 46 in the top region of the partition 42 and the much smaller bottom slot 48 allows the hydrocarbon vapors to enter the main section 42 without causing a differential pressure to develop between the preheater section 40 and the main section 42. Otherwise, such a pressure differential could force hydrocarbons in the preheater section 40 through the bottom slot 58. In effect partition 42 allows the preheater section 40 to begin the phase separation function. The bottom slot allows the water phase to flow along the bottom of the vessel 12 at a level where the water is not as likely to come into contact with the heater tube 28. Any hydrocarbons, particularly crude oil, produced from the wellstream fluid 10 will tend to flow through an larger upper slot 46 and come into direct contact with the heater tube 28. In other words, the preheat section 40 in this preferred arrangement constitutes a "separate vessel" which communicates with the main section vessel 42 by the above noted slots 46 and 48. However, those skilled in the art will appreciate that this is true only in the dynamic sense, as the feed flows through the preheater. If however, the flow stops, the system will reach an equilibrium in which the preheater becomes little more than an extension of the main section 42. In the presence of flow, however, it combines with the limited amount of heat available from the exhaust and the fact that the heat transfer rate is determined by temperature differential, these factors combine to create a temperature profile along the heater tube which is utilized in this aspect of the invention.

Moreover, any gas generated in the preheater section 40 also serves the further purpose of producing a spraying and/or mixing effect in the oil phase as it passes through the upper slot 46. Such a mixing action within the hydrocarbon phase itself is also a preferred feature of this process. It derives from the fact that removal of the lighter fractions from the hydrocarbon phase does not significantly change the specific gravity of the hydrocarbon phase. The "cooked" oil will tend to remain in the upper levels of the main section 42. Its effective gravity is lowered at the progressively higher temperatures of the temperature profile created in the vessel. Consequently, incoming, cooler, wellstream fluids 10 will tend to fall to the lower levels of the hydrocarbon phase. Failure to provide for this circumstance can result in less efficient operations since the incoming "new oil", upon entering the main section 44, may flow along the bottom of the hydrocarbon phase and exit without being raised to the temperature required to vaporize its lighter hydrocarbons.

The tendency toward nonmixing produced by the above noted temperature profile conditions can be dealt with in a number of ways. For example, the cooked hydrocarbon could be removed from the top of the main section 42. However, this would tend to increase rather than decrease the inventory of water in main section 42. Therefore, other mixing methods are preferred. For example, the upper slot 46 can be provided with a variety of distribution systems (not shown) which in effect could cause oil leaving the preheater section 40 to be more or less evenly distributed over the length of the heater tube 28. This would tend to insure that all of the new oil is heated to the temperature necessary to vaporize its lighter hydrocarbons. In addition, the vapors generated throughout the entire lower section 30 of the vessel 12 do tend, to some extent, to force a mixing of the old and the new oil.

Applicant has however, found that the most preferred method for mixing the hydrocarbon phase is through the use of at least one thermal riser 48 extending vertically through the heater tube 28, preferably near the hottest, exhaust intake side 34 of the lower section 30. Locating the thermal riser 48 near the hottest part of the heater tube 28 will cause the liquid in the riser to be heated more than the liquids in the remainder of the vessel. This in turn causes the liquid in the riser 48 to become less dense than the surrounding liquid due to thermal expansion effects. Consequently the hotter liquid rises and is expelled out of the open top 50 of the riser 48. Denser, cooler liquid then flows in the bottom 52 of the riser 48 to replace the expelled liquid. Placement of the bottom 52 of the riser 48 near the bottom of the lower section 44 of the vessel 12, causes riser 48 to collect liquid at this level. Therefore, the bottom 52 of the riser 48 should be set so that it is near the bottom of the oil phase, but still above the normal level of the water phase. Consequently any oil on the lower levels of the oil phase will be brought up through the riser 48 and exposed to the vaporizing action of the heater tube 28. During start up operations the riser 48 will most likely be in the water phase until an inventory of oil, in the form of an oil phase which floats on the water phase, is established at a level at or below the bottom 52 of the riser 48.

The light hydrocarbon vapors thus produced naturally arise to the uppermost level of the lower section 30. FIG. 2 shows lower section 30 as having a vertical section 54 which forms a distinct uppermost region. It is capped by a solid ceiling 56. Consequently, the vapors generated in the lower section tend to collect in this upper region between the ceiling 56 and the top surface 57 of the liquid within the lower section 30 of the vessel. Thereafter, and preferably by the processes hereinafter more fully described, the vapors are transferred, via gas outlet valve 60, to a distinct and separate upper section 58 where they are collected for subsequent use as engine fuels. As previously noted in the discussion of FIG. 1, the upper section could be completely detached from the lower section so that it constitutes a second distinct vessel rather than a contiguous upper section of vessel 12. Placing the second section above and contiguous to the lower section is, however, a highly preferred embodiment of this invention because here in this position it is readily heated by the hotter lower section. Consequently, the fuel produced can be kept in a vapor rather than a liquid state.

The pressure created by the vapors generated by this process tends to force the top surface of the liquid level 57 downward. As previously discussed, if the pressure in vessel 12 were greater than the pressure on the incoming wellstream fluid 10, the vessel 12 would tend to be emptied out through line 18 if, as previously discussed, check valve 22 did not prevent backflow of this type in those situations where temperature control valve 24 is open and the pressure in the vessel was greater than the pressure on the incoming wellstream. As the liquid level 57 rises upon intoduction of new wellstream fluid, it encounters a lower set point 66 and an upper set point 64. As the liquid level 57 is forced downward by the pressure created by the vapor, the liquid level 57 will eventually reach the lower set point 66 of liquid level controller 62. This will cause liquid outlet valve 68 to close and also cause fuel vapor outlet valve 60 to open. Closing the liquid outlet valve 68 will prevent the high pressure in the vessel from needlessly discharging all of the liquid in the lower section 30, particularly the hydrocarbon "inventory" built up in the form of the progressively enlarged hydrocarbon phase floating on the water phase. Thus, liquid level controller 62, by varying liquid level 57 in the vessel 12, and thus the vapor space, and by closing liquid outlet valve 68, plays a role in establishing the pressure within the vessel 12. In the operation of this process, pressure becomes a function of the temperature, feed rate and vapor space available. Here again this is a dynamic situation. In any event, the hydrocarbon phase will eventually, through repetition of the filling and emptying of the vessel under the above described conditions, enlarge from the fraction originally found in the wellstream and reach its highest fraction and thickest horizon in the vessel. Thereafter the introduction of a wellstream having a water component will cause a similar water component to be emptied from the vessel. Meanwhile opening the fuel vapor outlet valve 60 allows the collected vapors to enter the upper section 58. This upper section 58 acts as a fuel reservoir. It accepts fuel vapors if the pressure in the lower section 30 is greater than the pressure in the upper section 58. If the engine (not shown) has not used enough fuel to create this pressure differential little or no vapor will flow into the reservoir-like upper section 58.

An important and highly preferred feature of this process is the fact that while liquid outlet valve 68 is closed, the temperaure control valve 24 can, if the temperature in the lower section 30 is higher than the selected set point temperature of the temperature control valve 24, continue to feed new incoming wellstream fluid 10 into the vessel 12. That is to say, the temperature within the vessel, rather than the liquid level of the vessel, controls the act of admitting new wellstream fluid 10. Eventually, the liquid level 57 will rise to the upper set point 64 of the level controller 62. This will cause the gas outlet valve 60 to close and also cause the liquid outlet valve 68 to open. Preferably a liquid dump line 70 is located at or near the bottom of lower section 30 of vessel 12. Its location can aid in accurately and automatically controlling the location of the oil/water interface at a level which is most preferably below the level of the heater tube 28 and thereby assuring that incoming heat is transferred to the oil phase rather than to the underlying water phase during "normal operations" of the process. Locating dump line 70 here, implies that water from the water phase will be emptied first. Consequently, the repeated process of filling the lower section 30 with an oil and water mixture or emulsion and dumping "pure water" will build an inventory of oil, in the form of an enlarged hydrocarbon phase in the lower section 30. Consequently, the oil phase rather than the liquid phase comes into predominate contact with the heater tube 28. As the botom of the oil phase, produced at least in part by the action of the heater tube 28, gets progressively lower, it will eventually reach liquid outlet connection 70. After this occurs, the lower section 30 will be fed with a mixture of oil and water and be discharging a mixture of oil and water. In other words the oil inventory under these circumstances has been built to its highest level in the form of the thickest hydrocarbon phase possible.

Opening liquid outlet valve 68 will allow water and/or cooked or spent wellstream fluids to be returned to the gravity separation tanks, heater treaters and/or storage tanks (not shown) previously discussed with respect to bypass path 14. Preferably liquid outlet valve 68 is also a backpressure valve which will permit discharge only if the pressure in the vessel is higher than the downstream side of backpressure valve 68. If the pressure in the vessel is not higher than the downstream pressure, by means of a spring loaded check valve 72, will prevent downstream fluids from entering lower section 30, via line 70. In any case, the liquid level 57 will again descend to the lower setting 66 of level controller 62 as vapors are boiled off and vapor pressure again builds up. Thereafter, the entire cycle will be repeated.

Meanwhile fuel vapors collected in the upper section 58 are preferably kept warm by their proximity to the lower section 30. The vapors are transported to the engine's fuel system (not shown) via a collector such as standpipe 74. Preferably this standpipe also passes through the heater tube 28. This is most conveniently done inside of the lower section 30 at a point 76 near the hottest part of the heater tube 28. This arrangement will tend to superheat the fuel prior to its entry into the engine's fuel system and thereby minimizing the possibility of introducing liquids into engines of the type (i.e., internal combustion engines) which can not accept fuels still in their liquid form. However, as previously noted, in the event that the engine were a steam engine rather than an internal combustion engine, this process could just as well supply liquid fuels which could be, with the aid of the appropriate fuel equipment, be used to fire a boiler. Similarly, assuming use of the fuel in an internal combustion engine, the fuel vapors also may have to undergo additional preferred processes to prepare them for efficient combustion. For example, FIG. 1 indicates the installation of a fuel scrubber 78 in line 80 which leads to the engine's fuel system.

Another preferred feature of this process is another control loop consisting of a temperature controller 82 used in conjunction with an engine exhaust diverted valve 84. The temperature controller 82 senses the temperature near the top of the oil phase. If this temperature rises above the set point of the controller 82, it causes the diverter valve 84 to divert the incoming engine exhaust 32 to the atmosphere rather than allowing it to enter heater tube 28. This control loop sets the highest temperature that can be reached in the vessel 12. It is this temperature, in conjunction with the pressure within the lower section 30 and the composition of the wellstream fluid 10, which determines the composition of the vapors driven off the hydrocarbon phase. A higher setting, with all other variables being the same, would produce a fuel having higher percentages of heavier fractions of the wellstream hydrocarbon fluid. As previously noted $C_1$ to about $C_6$ hydrocarbon vapors, and particularly those of $C_3$, propane, are preferred fuels for most internal combustion engines. Heavier fractions with much longer carbon chains can of course be used to fire steam boilers. Moreover, the presence of such a control loop serves as a highly desirable safety system in the event that flow is interrupted, or a pure water slug is encountered etc. If the oil in the vessel were raised to the temperatures (e.g., 700°-800° F.) of engine exhaust heat, it could form harmful tars or coke as well as produce dangerously high pressure in the system.

Those skilled in the art will appreciate that many other modifications to the processes and apparatus could be made without departing from the scope and spirit of this invention. Such modifications however will generally serve to enhance those essential concepts of this invention previously noted.

Thus having disclosed my invention, I claim:

1. An apparatus for progressively enlarging the hydrocarbon component of a portion of a wellstream fluid having both a hydrocarbon component and a water component from a fraction originally found in the wellstream fluid to an enlarged fraction, separating the hydrocarbon component from the water component and vaporizing at least a portion the hydrocarbon component for use as a fuel, said apparatus comprising:

a vessel system having a first section for containing the wellstream fluid and a second section for containing hydrocarbon vapors generated from a liquid hydrocarbon phase which forms on the remainder of the wellstream fluid as a result of, at least in part, the action of a heater tube located in the lower section of the vessel, said heater tube passes through the first section of the vessel and is fluidly connected to a source of heat wherein the heat is introduced into said first section in order to effect a heat exchange primarily directed at an enlarging hydrocarbon component which forms on top of the remainder of the wellstream fluid and thereby vaporizing lighter hydrocarbons of the hydrocarbon phase;

inlet means for introducing fluids into the first section of the vessel;

outlet means for removing hydrocarbon vapors from the second section;

sensor and temperature controlled valve means associated with said inlet means for introducing wellstream fluid into the vessel when the temperature within the vessel reaches a given level;

means for removing hydrocarbon vapors from the first section to the second section;

means for sensing and reacting to liquid levels in the first section; and means for removing at least a portion of the remaining wellstream fluid from the first section of the vessel when the level of the liquid hydrocarbon phase reaches a prescribed level in the first section.

2. An apparatus for progressively enlarging the hydrocarbon component of a portion of a wellstream fluid having both a hydrocarbon component and a water component from a fraction originally found in the wellstream fluid to an enlarged fraction, separating the hydrocarbon component from the water component and vaporizing at least a portion of the hydrocarbon component for use as a fuel, said apparatus comprising:

a vessel system having a lower section for containing the wellstream fluid and an upper section for containing vapors generated from a liquid hydrocarbon phase which forms on the remaining wellstream fluid in the lower section due, at least in part, to the action of a heater tube located in the lower section of the vessel, said heater tube passes through the first section of the vessel and is fluidly connected to a source of exhaust heat wherein the exhaust heat is introduced into said first section in order to effect a heat exchange primarily directed at the enlarging hydrocarbon component which forms on top of the remainder of the wellstream fluid and thereby vaporizing the lighter hydrocarbon phase;

inlet means for introducing fluids into the lower section of the vessel;

outlet means for removing hydrocarbon vapors form the upper section;

sensor and temperature controlled valve means associated with said lower section inlet means for introducing wellstream fluid into the vessel when the temperature within the vessel reaches a given level;

means for removing the lighter hydrocarbon phase from the lower section to the upper section;

means for sensing and reacting to liquid levels in the lower section; and means for removing at least a portion of the remaining wellstream fluid from the lower section of the vessel when the level of the liquid hydrocarbon phase reaches a prescribed level in the lower section of the vessel.

3. An apparatus for progressively enlarging the hydrocarbon component of a portion of a wellstream fluid having both a hydrocarbon component and a water component from a fraction originally found in the wellstream fluid to an enlarged fraction, separating the hydrocarbon component from the water component and vaporizing at least a portion of the hydrocarbon component for use as a fuel, said apparatus comprising:

a vessel system having a lower section for containing an oil wellstream fluid and an upper section for containing hydrocarbon vapors generated from an oil phase which forms on the remaining oil wellstream fluid in the lower section due, at least in part, to the action of a heater tube located in the lower section of the vessel, said heater tube passes through the lower section of the vessel and is fluidly connected to a source of exhaust heat from an internal combustion engine wherein the exhaust heat from an internal combustion engine is introduced into said lower section in order to effect a heat exchange primarily directed at the oil phase which forms on top of the remainder of the wellstream fluid and thereby vaporizing the lighter hydrocarbons of the oil phase;

inlet means for introducing fluids into the lower section of the vessel;

outlet means for removing hydrocarbon vapors from the upper section;

sensor and temperature controlled valve means associated with said lower section inlet means for introducing wellstream fluid into the vessel when the temperature within the vessel reaches a given level;

sensor and valve means for controlling the level of the wellstream fluid in the lower section of the vessel;

means for mixing lower horizons of the oil phase with upper horizons of the oil phase;

valve means including a conduit for delivering the lighter hydrocarbon vapors from the lower section of the vessel to a separate upper section of the vessel for storage and subsequent use as a fuel; and valve means including a conduit located at a level lower than that of the heater tube for removing at least a portion of the remaining wellstream fluid from the lower section.

4. An apparatus for progressively enlarging the hydrocarbon component of a portion of a wellstream fluid having both a hydrocarbon component and a water component, separating the hydrocarbon component from the water component and vaporizing at least a portion of the hydrocarbon component for use as a fuel, said apparatus comprising:

a vessel system having a lower section for containing an oil wellstream fluid and an upper section for containing hydrocarbon vapors generated from an oil phase which forms on the remaining oil wellstream fluid in the lower section due, at least in part, to the action of a heater tube located in the lower section of the vessel, said heater tube passes through the lower section of the vessel and is fluidly connected to a source of exhaust heat from an internal combustion engine wherein the exhaust heat from an internal combustion engine is introduced into said lower section in order to effect a heat exchange primarily directed at the oil phase which forms on top of the remainder of the wellstream fluid and thereby vaporizing $C_1$ to about $C_6$ hydrocarbons of the oil phase;

inlet means for introducing fluids into the lower section of the vessel;

outlet means for removing hydrocarbon vapors form the upper section;

temperature controlled valve means associated with said inlet means for introducing wellstream fluid into the lower section of the vessel when the temperature within the vessel reaches a given level;

sensor and valve means for controlling the level of the wellstream fluid in the vessel;

means for mixing lower horizons of the oil phase with upper horizons of the oil phase;

valve means for delivering vaporized $C_1$ to about $C_6$ hydrocarbons from the lower section of the vessel to a separate upper section of the vessel for storage and subsequent use as a fuel;

heat exchange means for superheating the vapors of the $C_1$ to about $C_6$ hydrocarbons before leaving the vessel;

heat exchange means for preheating incoming wellstream fluid; and means for removing at least a portion of the remaining wellstram fluid from the lower section, said means being located at a level lower than the level of the heater tube near the bottom of the vessel so that the first portion of the remaining wellstream fluid so removed tend to be a water phase which tends to form on the bottom of the lower section.

5. A process for progressively enlarging the oil component of a portion of wellstrean fluid having both a hydrocarbon component and a water component, separating the oil component from the water component and vaporizing the oil component for use as a fuel, said process comprising:

preheating the wellstream fluid before it enters a separation vessel;

controlling the input of wellstream fluid into the vessel based upon a temperature based verification that the conditions in the vessel are capable of vaporizing at least a portion of any lighter hydrocarbons in the vessel;

subjecting the hydrocarbon component of the wellstream fluid to the heating action of the exhaust heat of an engine and thereby causing at least a portion of the wellstream fluid to form a liquid hydrocarbon phase which floats upon a water phase;

adjusting the level of the wellstream fluid in the vessel by dumping said fluid when it reaches a prescribed higher level and stopping dumping said fluid when it reaches a prescribed lower level;

sensing the prescribed lowered level of the liquid hydrocarbon phase and thereby closing a liquid outlet valve to prevent discharge of wellstream fluid from the vessel and opening a vapor outlet valve to permit discharge of vapors formed above the liquid hydrocarbon phase;

collecting the vapors in a separate section of the separation vessel;

superheating the vapors by the action of the exhaust heat before said vapors are used as a fuel;

feeding new wellstream fluid into the vessel only on the basis of the temperature conditions within the vessel; and sensing the prescribed higher level of the liquid hydrocarbon phase and thereby closing the vapor outlet valve and opening the liquid outlet valve so as to progressively increase the liquid oil component and decrease the water phase by filling the vessel with an oil and water mixture and discharging fluids having water concentrations greater than the water concentrations originally present in the incoming wellstream fluid.

6. A process for progressively enlarging the hydrocarbon component of a portion of a wellstream fluid having both a hydrocarbon component and a water component, separating the hydrocarbon component from the water component and vaporizing the hydrocarbon component for use as a fuel, said process comprising:

introducing wellstream fluid into a separation vessel only when the temperature within the separation vessel is above a prescribed level;

subjecting the hydrocarbon component of the wellstream fluid to the heating action of the exhaust heat of an engine and thereby causing at least a portion of the wellstream fluid to form a liquid hydrocarbon phase which floats upon a water phase;

adjusting the level of the wellstream fluid in the vessel by dumping said fluid when it reaches a prescribed higher level and stopping dumping said fluid when it reaches a prescribed lower level;

sensing the prescribed lowered level of the liquid hydrocarbon phase and thereby closing a liquid outlet valve to prevent discharge of wellstream fluid from the vessel and opening a vapor outlet valve to permit discharge of vapors formed above the liquid hydrocarbon phase;

feeding new wellstream fluids into the vessel only on the basis of the temperature conditions within the vessel; and sensing the prescribed higher level of the liquid hydrocarbon phase and thereby closing the vapor outlet valve and opening the liquid outlet valve so as to progressively increase the liquid hydrocarbon phase and decrease the water phase in the separation vessel by filling the vessel with an oil and water mixture and discharging fluids having water concentrations greater than the water concentrations originally present in the incoming wellstream fluid.

7. A process for progressively enlarging the oil component of a portion of wellstream fluid having both a hydrocarbon component and a water component, separating the oil component from the water components and vaporizing the oil component for use as a fuel, said process comprising:

preheating the wellstream fluid before it enters a separation vessel;

introducing the wellstream fluid into the separation vessel only when the temperature within the separation vessel is above a prescribed level;

subjecting the hydrocarbon component of the wellstream fluid to the heating action of the exhaust heat of an engine and thereby causing at least a portion of the wellstream fluid to form a liquid hydrocarbon phase which floats upon a water phase;

adjusting the level of the wellstream fluid in the vessel by dumping said fluid when it reaches a prescribed higher level and stopping dumping said fluid when it reaches a prescribed lower level;

sensing the prescribed lowered level of the liquid hydrocarbon phase and thereby closing a liqud outlet valve to prevent discharge of wellstream fluid from the vessel and opening a vapor outlet valve to permit discharge of vapors formed above the liquid hydrocarbon phase;

collecting the vapors in a separate section of the separation vessel;

superheating the vapors by the action of the exhaust heat before said vapors are used as a fuel;

feeding new wellstream fluid into the vessel only on the basis of the temperature conditions within the vessel; and sensing the prescribed higher level of the liquid hydrocarbon phase and thereby closing the vapor outlet valve and opening the liquid outlet valve so as to progressively increase the liquid oil component and decrease the water phase by filling the vessel with an oil and water mixture and discharging fluids having water concentrations greater than the water concentrations originally present in the incoming wellstream fluid.

* * * * *